UNITED STATES PATENT OFFICE.

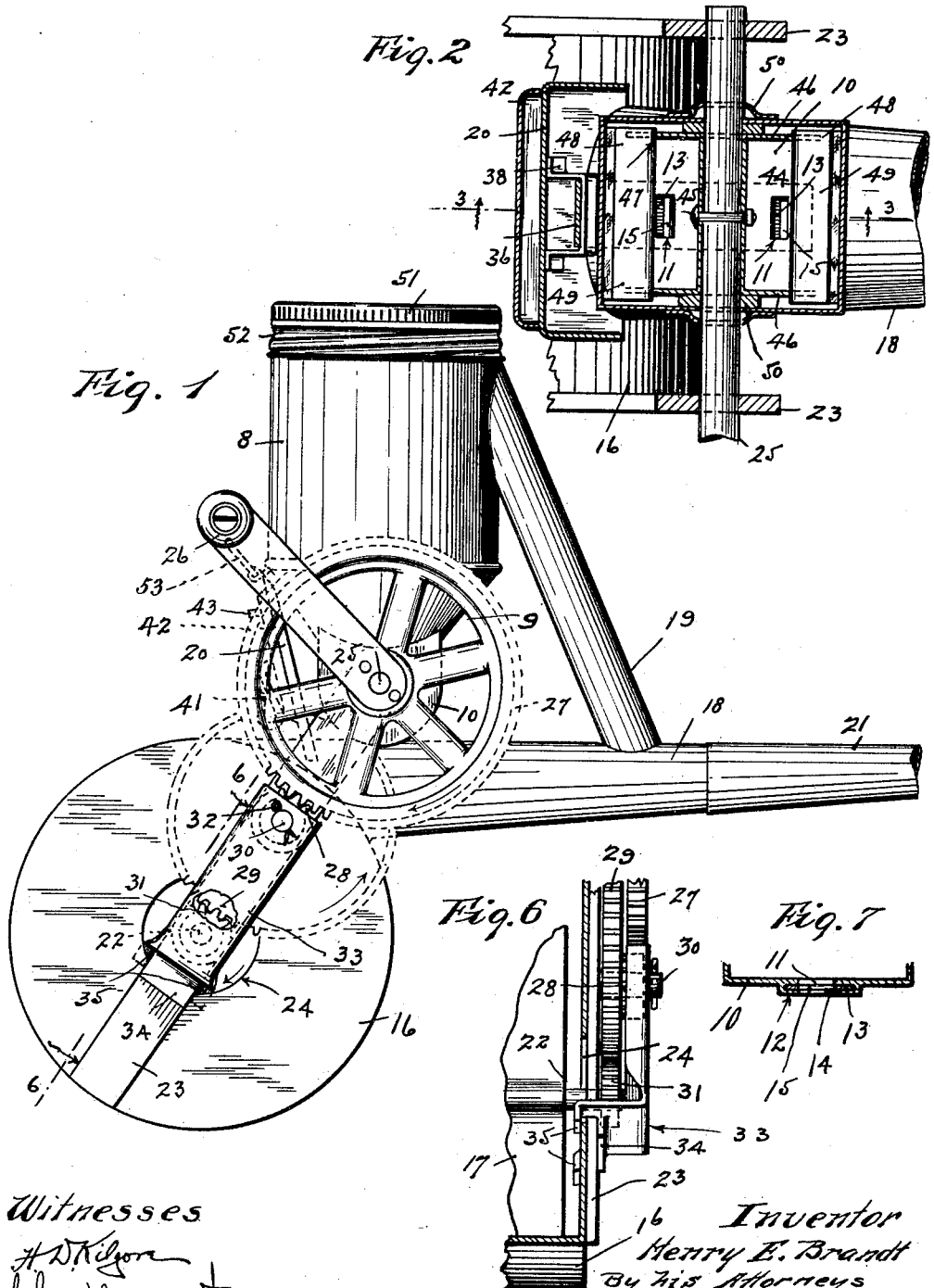

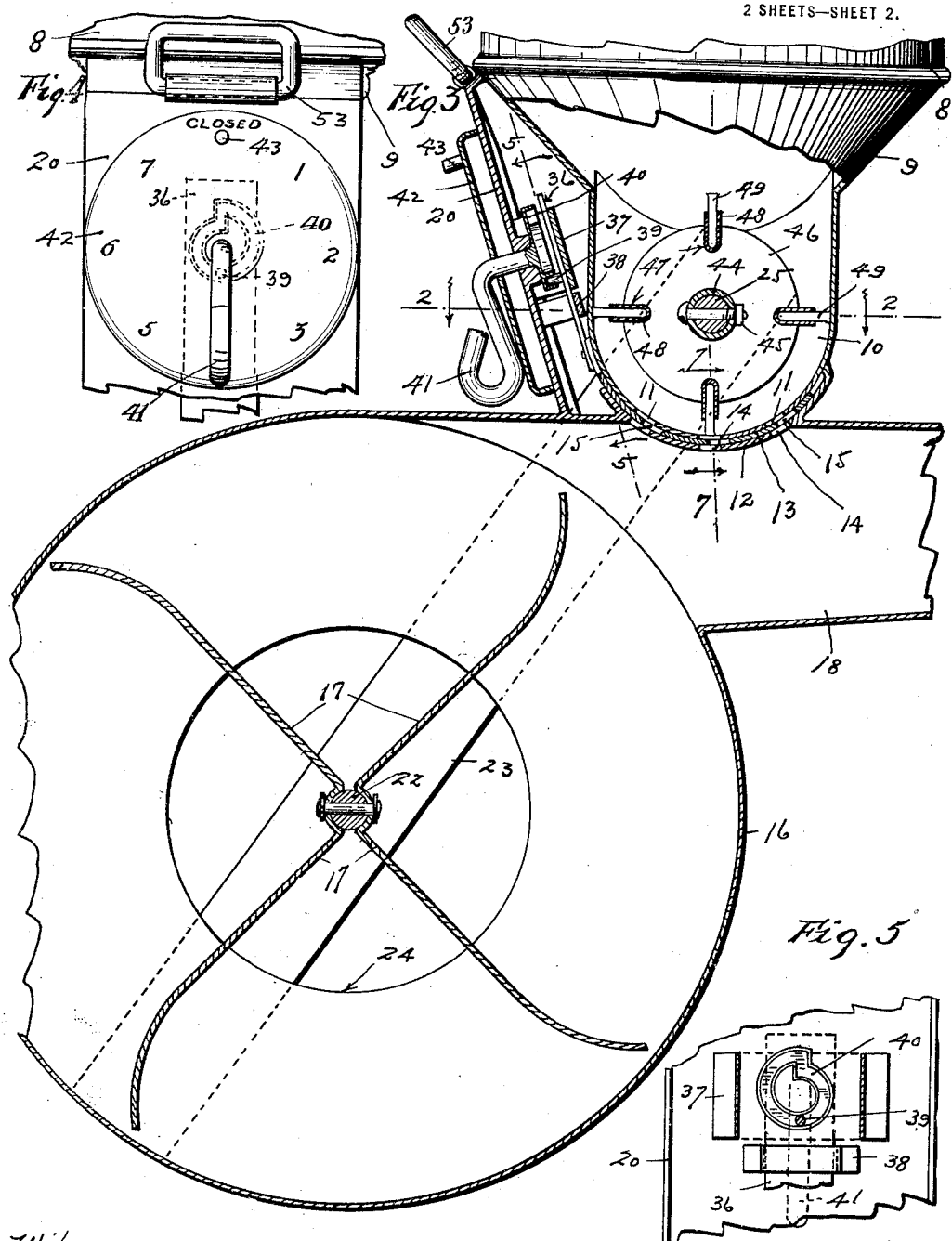

HENRY E. BRANDT, OF STILLWATER, MINNESOTA.

POWDER-DISTRIBUTER.

1,368,477.  Specification of Letters Patent.  Patented Feb. 15, 1921.

Application filed September 28, 1918. Serial No. 256,109.

*To all whom it may concern:*

Be it known that I, HENRY E. BRANDT, a citizen of the United States, residing at Stillwater, in the county of Washington and State of Minnesota, have invented certain new and useful Improvements in Powder-Distributers; and I do hereby declare the following to be a full, clear, and exact description of the invention, such as will enable others skilled in the art to which it appertains to make and use the same.

My present invention has for its object to provide an extremely simple and highly efficient powder distributer for blowing insect destroying powder evenly and thoroughly over growing vegetation, such, for instance, as potato vines. To the above ends, generally stated, the invention consists of the novel devices and combinations of devices hereinafter described and defined in the claims.

Insect destroying powder, as is well known, is very finely ground and capable of being blown in a very light spray, provided both the powder blowing and powder feeding devices are properly arranged for effecting such a result. Hitherto, however, it has been a common fault with these devices that either the blast would be uneven or not continuous, or that a sufficiently fine adjustment for the even delivery of the powder has not been possible. My invention provides means, both for properly supplying the powder even in finely granulated quantities and for properly and evenly blowing the same in an even blast, onto the vegetation or point of delivery.

The preferred form of this improved device is illustrated in the accompanying drawings wherein like characters indicate like parts throughout the several views.

Referring to the drawings:

Figure 1 is a side elevation showing the improved so-called powder distributer;

Fig. 2 is a horizontal section taken approximately on the line 2—2 of Fig. 3, some parts being broken away;

Fig. 3 is a view principally in vertical section taken on the line 3—3 of Fig. 2;

Fig. 4 is a fragmentary detail view in elevation;

Fig. 5 is a detail in vertical section taken on the line 5—5 of Fig. 3;

Fig. 6 is a view partly in elevation and partly in section taken on the line 6—6 of Fig. 1, on an enlarged scale; and Fig. 7 is a detail view in section taken on the line 7—7 of Fig. 3.

The powder is adapted to be contained in a powder tank 8, which has a hopper-like lower portion 9, the bottom of which terminates in an approximately semi-cylindrical so-called reel chamber 10. The cylindrical bottom 10 is provided with a plurality of circumferentially spaced transverse slots or discharge ports 11. A secondary or lower cylindrical bottom plate 12 is secured below the cylindrical bottom 10 concentric therewith but spaced therefrom far enough to permit a cylindrical valve plate 13 to work therebetween, with freedom for movements between the bottom plates 10 and 12. The said lower bottom plate 12 is provided with slots or discharge ports 14 which are alined with the corresponding ports 11; and the valve plate 13 is provided with correspondingly spaced discharge ports 15 adapted to be moved into and out of registration with the alined ports 11 and 14, so as to thereby, at will, either entirely close said ports, or to open the same to any desired extent, varying between a minimum and maximum opening.

For blowing the powder with a continuous action, I provide a fan made up of a casing 16 and a rotary blade-equipped fan head 17 working therein. The casing 16 is rigidly secured in respect to the tank 8 and is provided with a tangential discharge spout 18 that extends under the cylindrical bottom of the tank and into which the ports 11, 14, and 15 directly open. Here it is important to note that the cylindrical bottom of the hopper or tank extends downward considerably into the spout 18, so that air discharged through said spout will be blown directly against the under surface of said bottom and thereby insure instantaneous taking up of the powder by the air blast. In fact, the above noted plate 12 constitutes a part of the upper wall of said spout 18, and forms one of the rigid connections between the hopper and fan casing. The tank 8 is also rigidly connected to the outer end portion of the spout 18 by a strut or post 19, which affords a suitable hand piece, by means of which the device may be conveniently carried or held while in operation.

As best shown in Fig. 3, the spout 18 is further rigidly tied to the tank 8 by a bearing plate 20. The spout 18 will be provided with an extension spout 21, the end of which will be properly formed for delivery of the blast of dust-laden air onto the vegetation or plants. The fan head 17 is secured to a short shaft 22 journaled, as shown, in flat metal straps 23 secured to the sides of the fan casing 16. These straps 23 do not close, but simply cross the axial air intake ports 24 of the fan casing 16.

Extending through the sides of the lower portion of the hopper 9 with its axis incident with the axis of the cylindrical surface of the bottom plates 10 and 12, is a crank shaft 25, which, at one end, is provided with an operating crank or hand piece 26. This shaft 25 is journaled in projecting ends of the metal straps 23, having its shaft bearings therein rather than in the sides of the hopper 9; and it will be here noted, by reference to Fig. 2, that the lower portion of the hopper is much narrower than in the fan casing.

The crank shaft 25 carries a large spur gear 27 that meshes with a small spur pinion 28 secured to the hub of a large intermediate spur gear 29, the said pinion 28 and gear 29 being journaled on a stud 30 projected from one of the straps 23. Gear 29 meshes with a small spur pinion 31 secured on one projecting end of the fan shaft 22. A cotter pin 32 holds the pinion 28 and gear 29 on the stud 30.

A guard 33, in the form of a channel plate, is provided for the driving connections between the shafts 22 and 25. This guard 33 embraces the adjacent strap 23 and its upper end is provided with a bore to receive the stud 30 and is held in position by the cotter pin 32. The lower transverse portion of the guard 33 is bent laterally inward to form a foot 34, which rests upon the strap 23, and thereby holds the guard out of engagement with the gears. The side flanges of the guard 33, at its foot 34, are bent to form a pair of prongs 35 which extend through the adjacent eye of the fan casing 16, engage the inner wall thereof by an endwise sliding movement of the guard, and, together with the foot 34, hold the lower end of said guard in position.

By adjusting the feed valve or gate 13, the projecting head thereof is preferably rigidly secured to the lower end of a short strap 36, which works in upper and lower keeper brackets 37 and 38, respectively. These keeper brackets 37 and 38 are rigidly secured to the back of the bearing plate 20, the latter of which holds the strap 36 against edgewise movement. Secured to the strap 36, is a stud 39, which works in a profile cam 40 on the inner end of an operating crank 41, journaled in the bearing plate 20 and a dial 42 secured to the outer face of said bearing plate. The keeper bracket 37 holds the strap 36 with its stud 39 in the profile cam 40.

By turning the crank 41, the ports 11, 14 and 15, may be progressively opened and closed, and, by reference to Fig. 3, it will be noted that the free or outer end portion of said crank bears against the dial 42, and thereby frictionally holds the same where set. A pin 43, at the top of the dial 42, stops the crank 41, when turned to the right, in which position of the crank, the ports 11, 14 and 15 are closed. From the stop pin 43, the dial 42 is graduated by stamping or marking thereon circumferentially spaced numerals one to seven, inclusive, which read from the right to the left.

The shaft 25, inside of the hopper 9, is provided with a sleeve 44 secured for rotation therewith by a bolt 45. At its ends, the sleeve 44 is provided with outstanding annular head flanges 46, having peripheral notches 47, in which are mounted and rigidly secured channel bars 48. Mounted in these channel bars 48, are radially disposed powder agitating brushes 49, made of felt or other suitable material, which rub over the cylindrical bottom 10, and stir up the powder to insure its entrance through the ports 11, 14, and 15. For preventing the escape of powder through the joint between the crank 25 and perforations through which it is passed in the sides of the hopper 9, pliable packing washers 50, preferably of felt, are placed around said shaft and are lightly, but closely pressed between the flanges 46 and the sides of the hopper.

The powder tank 8 is provided with a removable cover 51, which is preferably applied thereto by means of pressed threads 52. A loop 53 is secured to the upper end of the bearing plate 20 to which a strap, not shown, may be applied for suspending the device from the shoulders of the operator.

The operation and use of the device is probably obvious from the foregoing description, but may be briefly summarized as follows:—

Preferably, the device will, as indicated, be carried on a strap applied over the shoulders of the operator and attached to the loop 53. When the device is operated, while thus suspended from the shoulder strap, the crank handle 26 may be conveniently gripped by the right hand and the device steadied by gripping the strut 19 with the left hand. Rotation of the crank will, of course, rotate the fan at high speed and will rotate the agitating reel within the hopper, at a relatively low speed. The supply of powder through the ports may be very nicely regulated by proper adjustment of the cutoff valve gate, which action has already been fully described.

The blast produced will, of course, blow the powder in a continuously fine spray and the amount of powder carried by the blast may be regulated so that it will be just sufficient to produce the most efficient blast and to very evenly and thoroughly deposit the powder on growing vegetation or plants.

It will be noted that the spiral groove of the cam 40 extends on the face thereof, through 360 degrees and that it is so arranged that either extremity of said cam groove is engaged with the cam pin 39, the pointer acting operating crank 41 will be alined with the zero mark on the dial and the cam plate will then be set in a closed position, because its perforations will be out of registration with the perforations in the bottom of the powder hopper. Also, it will be noted, that in this device by arranging the profile or face cam to rotate on an axis perpendicular to the flat extended end of the valve plate, said cam is arranged to operate directly on the cam pin and in a direction to impart the most direct kind of movements to the valve plate. It also gives a very compact, certain and very cheap construction, which is moreover highly efficient and capable of being easily and quickly assembled.

The fan, as arranged, affords the best kind of a continuously acting blower. The rotary agitator or reel insures the even feed of the powder at a rate which, for any set adjustment of the valve or gate, gives a supply of powder that is proportionate to the intensity of the blast, the intensity of the blast, of course, being regulated by the speed at which the crank is driven.

What I claim is:—

1. In a powder distributer, the combination with a fan, the casing of which has an air spout, of a powder hopper having a curved bottom with perforations that open into the upper portion of said spout, a flat curved valve plate adjustable on the curved bottom of said hopper and having perforations that coöperate with the perforations thereof, said valve plate, at one end, having a flat straight portion provided with a laterally projecting cam pin, and a cam mounted to rotate on an axis that is perpendicular to the extended flat end of said valve plate and is provided with a spiral cam groove that engages and directly acts upon the said cam pin to adjust said valve plate.

2. In a powder distributer, the combination with a fan, the casing of which has an air spout, of a powder hopper having a curved bottom with perforations that open into the upper portion of said spout, a flat curved valve plate adjustable on the curved bottom of said hopper and having perforations that coöperate with the perforations thereof, said valve plate, at one end, having a flat straight portion provided with a laterally projecting cam pin, a crank acting pointer directly secured to said cam for moving the same, a dial with which said pointer coöperates, said dial having a zero mark for indicating the closed position of said valve plate, and the spiral groove of said cam having its extremities arranged to engage said cam pin, when said pointer is at the zero mark of said dial.

In testimony whereof I affix my signature in presence of two witnesses.

HENRY E. BRANDT.

Witnesses:

CLARA DEMAREST,

EVA E. KONIG.